Patented Feb. 20, 1940

2,191,139

UNITED STATES PATENT OFFICE 2,191,139

SUPPOSITORY

Francis E. Bibbins, Indianapolis, Ind., assignor to Eli Lilly and Company, Indianapolis, Ind., a corporation of Indiana No Drawing. Application March 14, 1938, Serial No. 195,818

4 Claims. (Cl. 167—64)

It is the object of my invention to produce a suppository which will remain solid at body temperature, contains oleaginous material which will carry the desired medicaments and which also remains solid at body temperature, and includes homogeneously mixed through that oleaginous material a comminuted hydrophilic substance which swells when exposed to water and which has relatively slight adhesive properties so that on such swelling when in contact with the body fluids it gradually sluffs off superficially of the suppository to set free progressively in small quantities the still solid oleaginous material and the medicaments contained therein.

The base for my suppositories may be considered to be the mixture of the oleaginous material and the comminuted hydrophilic substance, and to this base any desired medicament may be added which it is desired to apply by suppositories.

The oleaginous material may be of various types. What I prefer is a mixture of cocoa butter (oil of theobroma), to which has been added enough wax to raise the melting point to or higher than body temperature (98.6° F.), desirably to about 105° to 120° F. If such wax is used, bees-wax, spermaceti, carnauba wax, and ceresin (mineral wax) furnish examples of the waxes which may be used. Instead of using cocoa butter, which has a melting point below body temperature, and mixing it with a wax to raise that melting point, I may use an oil or fat which itself has a melting point sufficiently high, such for instance as mutton tallow or beef tallow. Many other variants are possible, and may be used in accordance with my invention so long as an oleaginous material is used or produced which has a melting point in the neighborhood of body temperature or higher.

The comminuted hydrophilic material which I prefer is comminuted agar. Instead of agar, however, I may use other hydrophilic substances, such for instance as elm bark, althea, powdered gelatin, Irish moss, Iceland moss, tragacanth, and pectin; which are merely examples of hydrophilic substances which are suitable because they swell when they come in contact with water and are sufficiently non-adhesive to permit the comminuted hydrophilic substance gradually to sluff off superficially from the suppository when the swelling occurs on contact with water. The hydrophilic material may itself be a medicament.

The medicaments which may be used are legion. Among the more common ones are boric acid, zinc oxide, extract of hamamelis, extract of hyoscyamus, various local anesthetics, various germicides, various astringents, and others which will occur to any pharmacist. The precise nature of the medicament is not material to my invention.

In making a suppository according to my invention, I mix thoroughly the desired proportions of the oleaginous material, the comminuted hydrophilic substance, and the medicament. Ordinarily the oleaginous material will constitute between 40% and 80% of the whole, the comminuted hydrophilic substance between 10% and 50%, and the medicament from a small fraction of one percent to between 25% and 30% depending on its nature.

The mixing may be done by melting the oleaginous material, and stirring in the comminuted hydrophilic substance and the medicaments, and permitting the whole to cool. The cooling may be either to a solid state or to a point short of the solid state as desired. If solidification is allowed to occur direct, then the solid mass may be formed in any desired way into suppositories of the desired size and shape, as by extruding the material from a power press. If the cooling is stopped short of solidification, and too if the solidified mass is reheated to obtain partial or complete melting, then the semi-solid mass may be poured into suitable molds to obtain suppositories of the desired size and shape.

Alternatively, the mixing may be done by comminuting the oleaginous material and mixing it with the comminuted hydrophilic substance and the medicament with all the ingredients in the dry state; and then forming suppositories from the mixture, either by pressure or by melting and pouring into molds.

Of course, in making these suppositories, it is essential that the material be kept substantially free from water, so that the water-absorbing and the swelling properties of the hydrophilic material may be preserved.

Examples of suppositories made in accordance with my invention are the following, with the proportions in parts by weight:

*Example 1:* I mix thoroughly, in either of the manners outlined above, the following ingredients:

| | |
|---|---|
| Cocoa butter | 50 parts |
| Bees-wax | 10 parts |
| Agar, comminuted | 20 parts |
| Medicaments consisting of some or all of the following: | |
| Zinc oxide | 10 parts |
| Bismuth subcarbonate | 5 parts |
| Powdered extract of belladonna | 0.5 part |
| 'Metycaine' (Gamma-[2-methylpiperidino]-propyl Benzoate Hydrochloride, Lilly) | 5 parts |

The medicaments and agar are both desirably put through a fine sieve before mixing, to insure even distribution in the mixture.

*Example 2:* A thorough mixture is made of the following ingredients:

| | | |
|---|---|---|
| Cocoa butter | 53 | parts |
| Bees-wax, white | 7.5 | parts |
| Carnauba wax | 1 | part |
| Agar, | 20 | parts |

Medicaments consisting of the following:

| | | |
|---|---|---|
| Althea, powdered | 12 | parts |
| 'Metycaine' (Gamma-[2-methyl-piperidino]-propyl Benzoate Hydrochloride, Lilly) | 5 | parts |
| 'Merthiolate' (Sodium Ethyl Mercuri Thiosalicylate, Lilly) | 0.02 | part |

*Example 3:* A thorough mixture is made of the following ingredients:

| | | |
|---|---|---|
| Mutton Tallow | 54.5 | parts |
| Agar | 20 | parts |
| Bees-wax | 10 | parts |

Medicaments consisting of the following:

| | | |
|---|---|---|
| P. E. Belladonna | 0.5 | part |
| Bismuth Subcarbonate | 5 | parts |
| Zinc Oxide | 10 | parts |

*Example 4:* A thorough mixture is made of the following ingredients:

| | | |
|---|---|---|
| Beef Tallow | 50 | parts |
| Bees-wax | 10 | parts |
| Iceland Moss | 20 | parts |

Medicaments consisting of the following:

| | | |
|---|---|---|
| Extract Witch Hazel | 10 | parts |
| Phenol | 0.05 | part |
| Zinc Oxide | 10 | parts |

In preparing any of these suppositories, I deem it desirable to subject the completed suppositories to thorough chilling for at least several days before putting them on the market.

The suppositories are used by topical application in the usual manner. When applied, the fluids which come in contact with the suppository cause the swelling of the agar (or other hydrophilic material used) at and near the surface of the suppository, and that swelling causes the agar to be sluffed off superficially, and progressively over several hours, to set free the oleaginous material and the medicaments associated with it at the surface of the suppository; and as that sluffing off occurs a new surface is continuously being exposed and the action continues gradually over a fairly long period of time, in some instances as long as six to eight hours. In other words, the suppository slowly disintegrates, from the surface inward, and thus makes the medicament as well as the oleaginous material slowly and continuously available over a long period of time.

Suppositories such as above described have the advantage over the usual greasy suppository in that they will not melt at body temperature, and so will not melt at any temperature ordinarily encountered in storage and transportation even in the summer. This makes it possible to put up the suppositories in packages which need not be fluid-tight, and may indeed be ordinary paper and pasteboard. Yet the suppository in use will have all the advantages of a greasy suppository; with the added advantage that the oleaginous material and the medicaments are rendered available in the body cavities at a relatively slow rate and over a period of time.

Thus, transportation and storage under refrigerating conditions, such as are usually required with hitherto known suppositories, are not necessary.

I claim as my invention:

1. A suppository base, consisting of a mixture of oleaginous material which has a melting point between body temperature and 120° F., and a comminuted hydrophilic material which expands on contact with water and has sufficiently slight adhesive properties to avoid interference with sluffing off of such material from the surface.

2. A suppository base, consisting of a mixture of cocoa butter, a wax in sufficient amount to raise the melting point of the mixed cocoa butter and wax at least to body temperature, and comminuted agar.

3. A suppository, consisting of a mixture of oleaginous material which has a melting point between body temperature and 120° F., a comminuted hydrophilic material which expands on contact with water and has sufficiently slight adhesive properties to avoid interference with sluffing off of such material from the surface, and a medicament.

4. A suppository, consisting of a mixture of cocoa butter, a wax in sufficient amount to raise the melting point of the mixed cocoa butter and wax at least to body temperature, comminuted agar, and a medicament.

FRANCIS E. BIBBINS.